Figure 10:
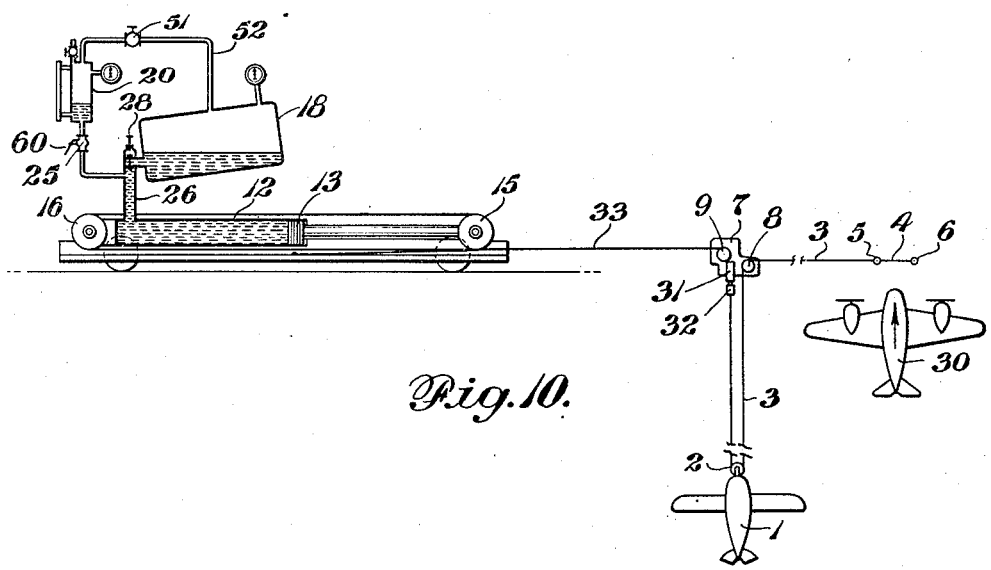

Dec. 16, 1947.　　　R. B. COTTON　　　2,432,508
GLIDER PICK-UP DEVICE
Filed Oct. 28, 1943　　　5 Sheets-Sheet 1
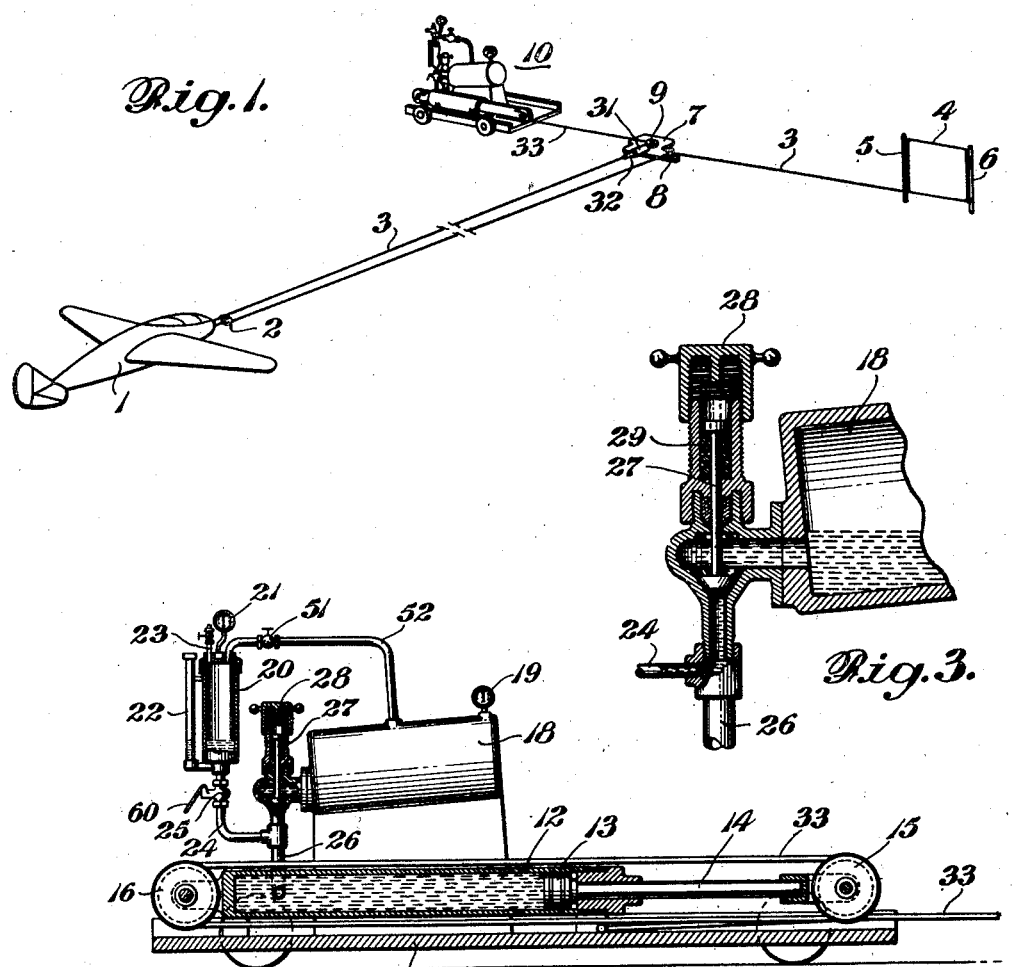
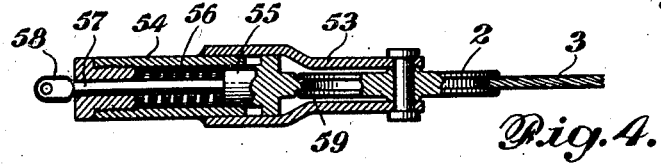
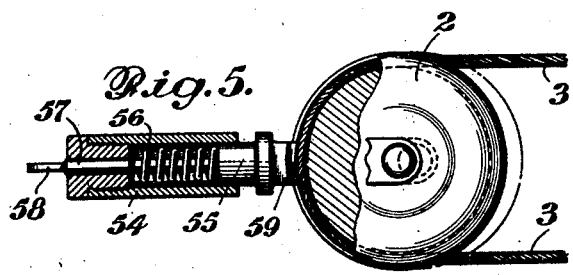
INVENTOR
Robert B. Cotton
BY
ATTORNEY

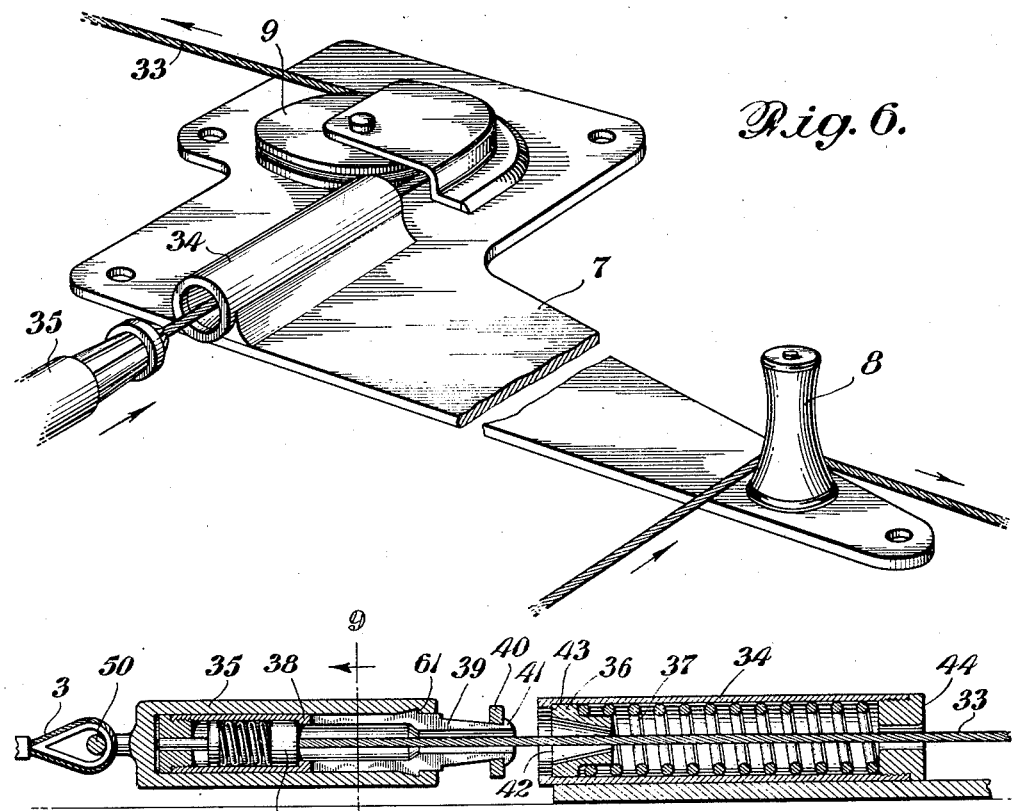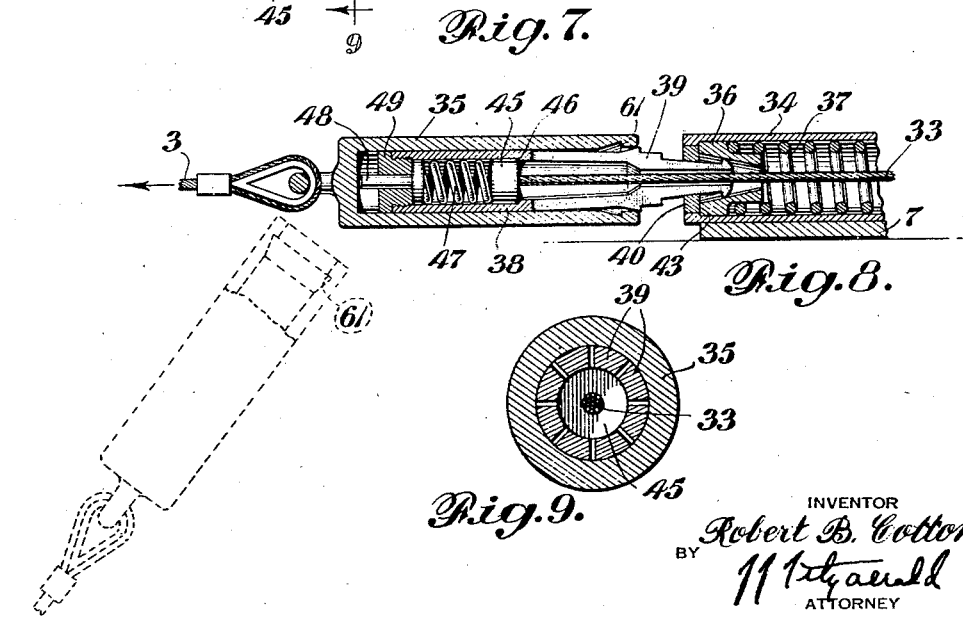

Dec. 16, 1947.  R. B. COTTON  2,432,508
GLIDER PICK-UP DEVICE
Filed Oct. 28, 1943  5 Sheets-Sheet 3

INVENTOR
Robert B. Cotton,
BY
ATTORNEY

Dec. 16, 1947.     R. B. COTTON     2,432,508
GLIDER PICK-UP DEVICE
Filed Oct. 28, 1943     5 Sheets-Sheet 4
Fig. 12.
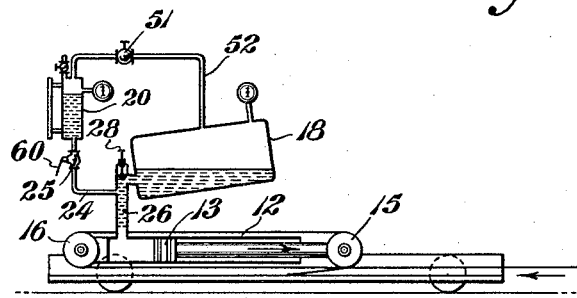
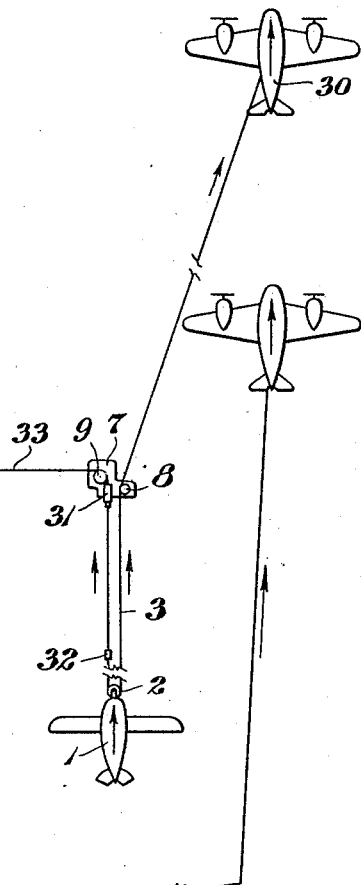
Fig. 13.
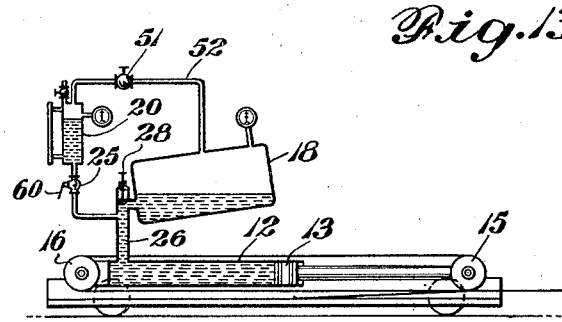
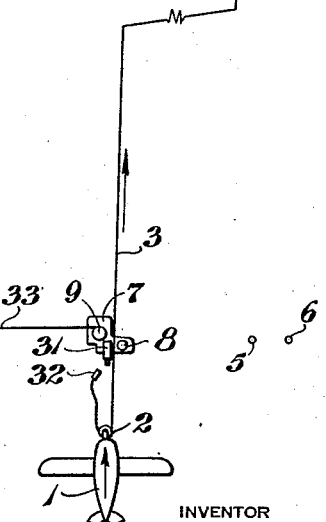
INVENTOR
Robert B. Cotton,
BY
ATTORNEY Dec. 16, 1947.  R. B. COTTON  2,432,508
GLIDER PICK-UP DEVICE
Filed Oct. 28, 1943   5 Sheets-Sheet 5

INVENTOR
Robert B. Cotton,
BY
ATTORNEY

Patented Dec. 16, 1947

2,432,508

UNITED STATES PATENT OFFICE 2,432,508

GLIDER PICKUP DEVICE

Robert B. Cotton, Lansdowne, Pa.

Application October 28, 1943, Serial No. 507,931

9 Claims. (Cl. 244—63)

(Granted under the act of March 3, 1883, as amended April 30, 1928; 370 O. G. 757)

The invention herein disclosed relates to glider pick-up apparatus of the type in which the glider which is at rest to begin with, is given a steady acceleration by energy obtained from a plane in flight until it reaches the speed of the plane, at which time a towline which has been picked up by the plane and which is connected to the apparatus, is released therefrom, and is gripped by a device on the glider for the subsequent towing of the glider by the plane.

The object of the apparatus is to transfer the energy necessary for accelerating the glider with a steady and reasonable acceleration from the plane in flight, until the gilder attains the speed of the plane and then to fix the towline for the subsequent towing of the glider by the plane.

Another object is to accomplish the above object without the necessity of carrying any of the apparatus in the glider or plane, except for a very light pulley on the glider comprising a part of the gripping means, and a light pick-up hook on the plane.

A further object is to use a hydraulic mechanism operated against a pressure accumulator to provide a continuous pull on the towline passed around the pulley at the nose of the glider, thus to store up part of the energy during the first part of the accelerating operation above referred to, while the glider velocity is low, and return it during the latter part thereof, thereby continuously providing only half of the steady accelerating force on the glider, the other half being in the meantime supplied to the glider directly from the plane through the other portion of the towline passed around the pulley.

A further object is to provide a take-up line connected between the hydraulic means and the towline which is passed around the pulley on the glider, means to release the towline from the take-up line when the glider reaches the speed of the plane, and means on the pulley to simultaneously grip the towline for the subsequent towing.

These and other more specific objects will become more apparent as the detail description of this invention proceeds. The preferred form of the apparatus is illustrated in the drawings wherein:

Fig. 1 shows the layout of the apparatus preparatory to the pick-up operation,

Fig. 2 is an enlarged view, partly in section, of the portable hydraulic and accumulator means, Fig. 3 is a further enlargement of the main valve, Figs. 4 and 5 are side and plan views, respectively, of the pulley and gripping means attached to the glider, Fig. 6 is a perspective view of the deck sheave, post and buffer assembly, Fig. 7 is a cross-sectional view of the buffer and the releasable coupling between the towline and the take-up line, prior to release, Fig. 8 is the same view with the parts in position immediately after release, the broken line figure showing the towline end fitting broken away from the rest of the coupling an instant later, Fig. 9 is a cross-section taken at 9—9 of Fig. 7, Figs. 10 to 13 are four consecutive views of the apparatus in its successive stages during the launching of the glider, and Figs. 14 to 21 are graphical illustrations of the characteristics obtained under one specific set of values used in the practice of this invention.

Referring more specifically to the several figures, the general layout of the apparatus may be seen in Fig. 1. The towline 3 is coupled at 32 to the take-up line 33 which passes from this coupling through the buffer 31, around the sheave 9 to the hydraulic means 10. From the coupling 32, the towline 3 is stretched back to the glider, passes around the pulley 2 attached to the nose of the glider, then back to sheave post 8, then sideways to the poles 5 and 6 where it ends in a loop 4 hung loosely on the poles so that it may be picked up by a pick-up hook depending from the plane which is to do the towing.

Figs. 2 and 3 show the details of the portable hydraulic mechanism 10 which has a hydraulic cylinder 12 and piston 13 with piston rod 14, a set of pulleys 15 at the end of rod 14, and a similar set 16 at the closed end of the cylinder. The take-up line 33 is passed around these pulleys and may be anchored at one end to the frame at 17, the other end being connected to the towline coupling as previously noted. The number of pulleys used in each of the sets determines the mechanical advantage of the mechanism. The cylinder 12 is connected by pipe 26 to an accumulator 18 by way of the main valve 27. Pipe 26 is connected by pipe 24 to the buffer tank 20 by way of check valve 25. Another pipe 52, with a small globe valve therein, connects the tops of the buffer tank and the accumulator. Manual means 60 is provided for lifting the check valve 25 off its seat. A sight gage 22 is provided on the buffer tank, and pressure gages 19 and 21 are mounted in the buffer tank and the accumulator respectively. A vent pipe 23 controlled by a globe valve is also provided in the top of the buffer tank.

The main valve 27 is normally held in its open position by spring 29. The knob 28 is turnably mounted by a screw-thread connection to the valve stem guide so that it can be screwed down to move the valve against the spring pressure to its closed position.

The details of the pulley attached to the glider may be seen in Figs. 4 and 5. The pulley 2 turns on a pin mounted in a yoke 53 having a sleeve portion 54 with a spring 56 therein compressed between a shoulder thereof and an enlarged portion 55 on pin 57 passing therethrough and having eyelet 58 at the outer end, which is fastened to the nose of the glider. The inner end of the enlarged portion 55 has a shoe 59 normally pressed against the towline 3 on the pulley to grip the towline with a force sufficient to overcome the pull on the towline necessary to tow the glider, but when a substantially greater force is applied to the towline such as is necessary during the glider acceleration, the spring 56 is further compressed to release the grip of the shoe 59 on the towline and permits the pulley 2 to turn freely, in accordance with the relative speeds of the plane and glider during the acceleration period.

In Fig. 6, a plate 7 is shown which may comprise an assembly of the sheave 9 around which the take-up line is passed, a buffer against which the releasing element of the coupling 35 strikes at the appropriate time, and a sheave post 8 around which the towline is passed when initially stretched between the glider and the poles 5 and 6 on which its end loop is hung.

The details of the buffer and coupling may be seen in Figs. 7 to 9. The buffer sleeve 34 has an inner shoulder 43 against which the slidable collar member 36 is normally resiliently held by spring 37, the other end of which is biased against the fixed collar member 44. Take-up line 33 passes through this buffer and is attached to the coupling plug 45 fitted against an inner shoulder in sleeve 38 and supporting one end of spring 47 therein, the other end of which biases a pin member 48 which extends through a collar fixed in the end of the sleeve 38. The other end of sleeve 38 has a series of resilient prongs 39 extending therefrom around its periphery. These prongs have a collar 40 mounted around their wedge formed ends so that when the collar is pushed over the wedged portions it brings the prongs radially toward the axis of the coupling. A peripheral shoulder formed by projections on the prongs is thereby moved radially within the circumference of the sleeve, while normally it has a greater diameter and is adaptable to lock over an internal shoulder 61 formed in a groove on the inside of the outer sleeve 35 comprising the other part of the coupling which is attached at 50 to the towline 3. The closed end of this outer sleeve forces the pin member 48 in against the pressure of spring 47 when the coupling is locked. When the coupling is pulled in against the buffer 34 by the take-up line 33, the collar 36 in the buffer sleeve strikes the collar 40 which normally rests against the shoulder formed at the nose 41 of the prong assembly. Movement of the prong ends into the hollow of the sleeve 34 and collar 36 where they are further wedged by the conical shape of the hollow in this collar, moves the collar 40 over the wedged portions of the prongs to draw the shoulder formed by the prongs inwardly out of the groove 61, and the pin member 48 assists in releasing the outer sleeve so as to break the connection and separate the coupling.

Figure 11:
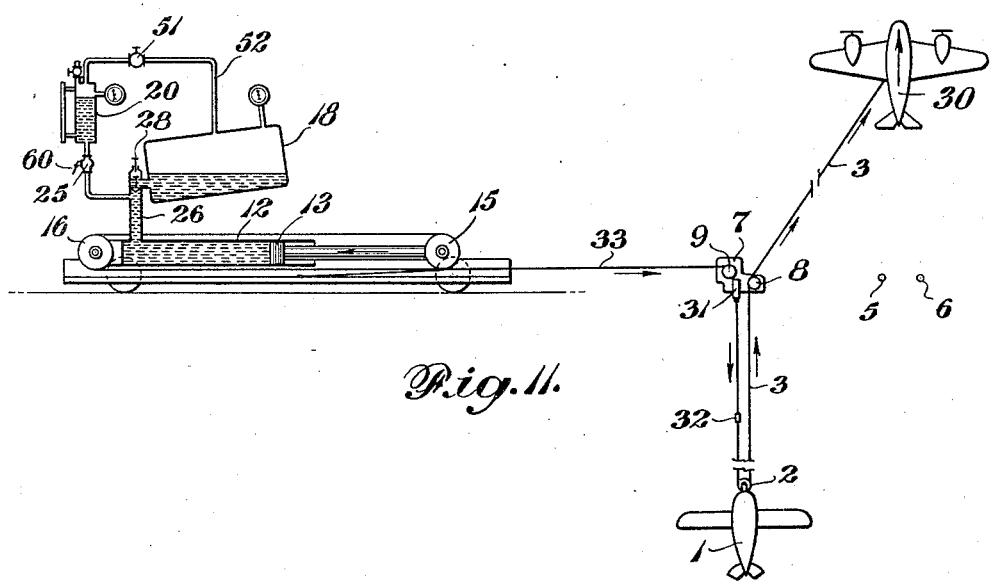
Figure 14:
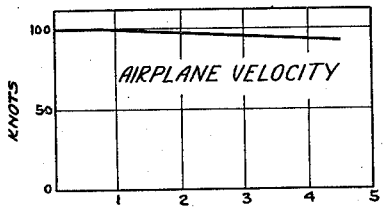
Figure 15:
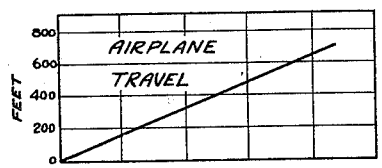
Figure 16:
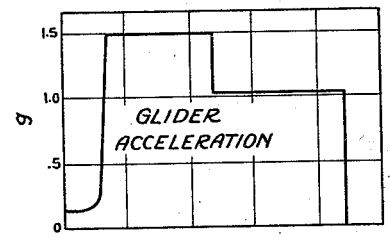
Figure 17:
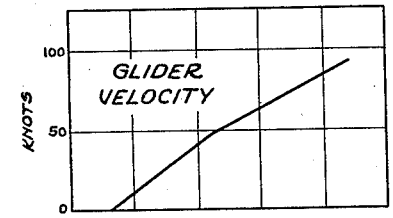
Figure 18:
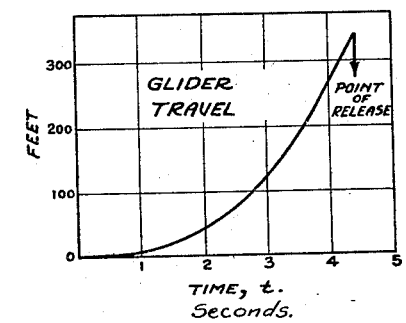
Figure 19:
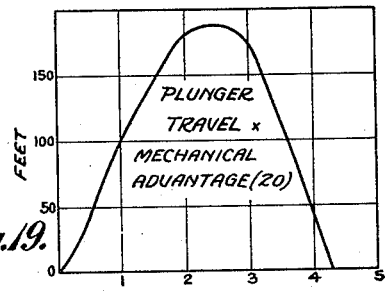
Figure 20:
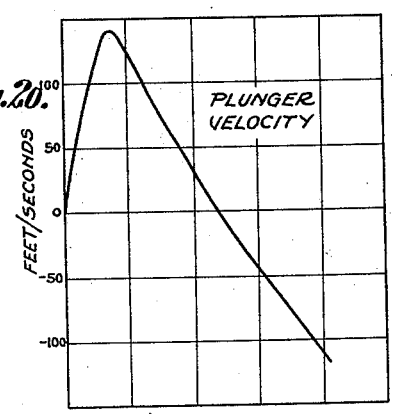
Figure 21:
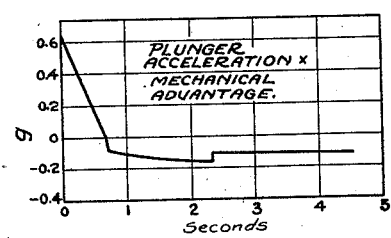

The operation of the apparatus is as follows:

Referring to Figs. 10 to 13, which represent four consecutive stages during the launching operation, Fig. 10 diagrammatically shows the starting set-up, with the pick-up plane 30 approaching the loop 4 of the towline. In Fig. 11 the towline has been picked up, the accelerating force applied to the glider is supplied jointly by the plane and the hydraulic mechanism.

The hydraulic system comprising the cylinder 13, the accumulator 18 and the buffer tank 20 is so controlled that the hydraulic pressure will convey a suitable force through the take-up line 33 and will permit the take-up line to move either one way or the other in order to maintain a substantially constant force throughout both the take-up line and the towline 3 which is half of the total accelerating force applied to the glider. This is done by maintaining a pressure in the accumulator 18 over the hydraulic medium of sufficient amount to act as a cushion and maintain a substantially constant pressure in the hydraulic system during the operation of the piston 13 on its advance and retract strokes. The buffer tank 20 is provided for furnishing a reduced pressure in the cylinder at the beginning of the operation so as to prevent too sudden a shock on the glider upon its initial movement.

Thus at the beginning the plunger 13 moves on its advance stroke against a reduced pressure, thus furnishing a reduced force for the initial acceleration of the glider while the hydraulic fluid is moved through the pipe 26, pipe 24 and check valve 25 into the buffer tank 20 against the low pressure of the air therein, valves 27 and 51 being closed at this time. As the piston 13 advances further and the pressure increases in the hydraulic system, it causes the valve 27 to open even against the high pressure in the accumulator. As soon as the valve 27 begins to open, spring 29 will raise it to its fully open position. Continued movement of the piston 13 then acts against the higher pressure in the accumulator to produce a substantially constant and reasonably large force to provide the necessary acceleration of the glider within the limits of the length of the towline for which it is designed. Fig. 12 shows the position of the piston on its retract stroke while maintaining the substantially constant force on the lines after about the middle of the acceleration period. In Fig. 13, the piston 13 is at the end of its retract stroke while the acceleration of the glider has suddenly dropped to practically zero. As a result of the decreased tension in the lines due to the sudden decrease of the acceleration of the glider and, therefore, of the accelerating force, the spring 56 in the connection between the pulley 2 and the glider has expanded and the shoe 59 has gripped the towline 3 against the pulley while at the same time the coupling 35 has reached the buffer 34 and has been released thereby in accordance with the procedure previously outlined, with reference to Figs. 7 to 9. Thus the glider continues from this position in tow behind the tow plane with the towline fully extended therebetween. The charts shown in Figs. 14 to 21 show the characteristics of the plane and glider as well as the hydraulic plunger as obtained in one specific form of the invention used by the applicant. The curves are plotted against time in seconds. From these charts it may be seen that the airplane travels about seven hundred feet during the launching operation while the glider travels three hundred and fifty feet with an acceleration of not exceeding 1.5 g. The initial plane velocity being at approximately 100 knots, gradually reduces to about 90 knots at the end of the acceleration period, the energy lost being transmitted through the towline to supply the constant force of acceleration on the glider with the assistance of the hydraulic plunger which maintains this force at a substantially constant and desired amount. The mechanical advantage of the pulley arrangement on the specific form used in obtaining these characteristics was 20 to 1, by the use of 10 pulleys at each end of the hydraulic system.

Various other designs of this system may be made to suit the requirements. The device of the apparatus used here may be changed in form and dimensions as desired without departing from the scope of this invention which is defined in the appended claims.

The invention described herein may be manufactured and used by or for the Government of the United States of America for governmental purposes without the payment of any royalties thereon or therefor.

What is claimed is:

1. A glider launching and towing apparatus for enabling a plane in flight to take in tow a glider resting on the ground, comprising a pulley on the glider, a line passed around said pulley and stretched forward having a loop at one end for picking it up by the plane in flight and being anchored at the other end, adjustable take-up means for said line between its anchored end and the glider, a source of substantially constant force connected to said take-up means to provide a constant tension in said line equivalent to approximately half the desired acceleration force, means to break the line on the force source side of the pulley when the glider speed has reached that of the plane, and means on the glider for simultaneously gripping the line for its subsequent towing by the plane.

2. Apparatus as defined in claim 1 including a sheave post in front of the glider around which the loop end of the line is passed and means for suspending the loop at a distance to one side of the glider axis so that the plane does not have to sweep dangerously low over the glider to pick up the loop.

3. Apparatus as defined in claim 1 including a sheave post in front of the glider around which the loop end of the line is passed and means for suspending the loop at a distance to one side of the glider axis so that the plane does not have to sweep dangerously low over the glider to pick up the loop, and a sheave in front of the glider around which the anchored end of the line is passed and extends to the other side of the glider axis where said line take-up means is located.

4. Apparatus as defined in claim 1 including a sheave post in front of the glider around which the loop end of the line is passed and means for suspending the loop at a distance to one side of the glider axis so that the plane does not have to sweep dangerously low over the glider to pick up the loop, and a sheave in front of the glider around which the anchored end of the line is passed and extends to the other side of the glider axis where said line take-up means is located, the said line take-up means including a pressure accumulator means and a hydraulic means for pulling in or paying out the line in accordance with the relative speeds of the glider and plane during the glider acceleration period.

5. Apparatus as defined in claim 1 including a sheave post in front of the glider around which the loop end of the line is passed and means for suspending the loop at a distance to one side of the glider axis so that the plane does not have to sweep dangerously low over the glider to pick up the loop, and a sheave in front of the glider around which the anchored end of the line is passed and extends to the other side of the axis where said line take-up means is located, the said line take-up means including a pressure accumulator means and a hydraulic means for pulling in or paying out the line in accordance with the relative speeds of the glider and plane during the glider acceleration period, said accumulator means storing and returning the hydraulic medium under substantially constant pressure to the hydraulic means.

6. Apparatus as defined in claim 1 including a sheave post in front of the glider around which the loop end of the line is passed and means for suspending the loop at a distance to one side of the glider axis so that the plane does not have to sweep dangerously low over the glider to pick up the loop, and a sheave in front of the glider around which the anchored end of the line is passed and extends to the other side of the glider axis where said line take-up means is located, the said line take-up means including a pressure accumulator means and a hydraulic means for pulling in or paying out the line in accordance with the relative speeds of the glider and plane during the glider acceleration period, said accumulator means storing and returning the hydraulic medium under substantially constant pressure to the hydraulic means, auxiliary buffer means under less pressure for supplying a smaller initial pressure to the hydraulic means at the beginning of its operation, and means for cutting off the connection between the hydraulic means and the accumulator during this initial period so as to supply only a smaller initial acceleration force to the glider at the beginning of the acceleration period to reduce the starting shock.

7. Apparatus as defined in claim 1 including a sheave post in front of the glider around which the loop end of the line is passed and means for suspending the loop at a distance to one side of the glider axis so that the plane does not have to sweep dangerously low over the glider to pick up the loop, and wherein the other end of the line is passed around a sheave and extends to the other side of the glider axis where said force source is located, the said force source including a pressure accumulator means and a hydraulic means for pulling in or paying out the line in accordance with the relative speeds of the glider and plane during the glider acceleration period, the said means for breaking the line comprising a releasable coupling and buffer through which the line operates and against which the coupling strikes at the time when the line is fully pulled in at the end of the acceleration period, and means for releasing said coupling responsive to said contact between the coupling and the buffer.

8. In a glider launching and towing apparatus, a plate including a sheave journaled at the front thereof, a buffer means mounted on said plate to the rear of said journaled sheave, and a sheave post mounted on one side of said plate, said buffer means comprising a sleeve fixed to the plate and having a fixed collar in its forward end and an internal shoulder at the rear end, a slidable collar within the sleeve and a spring between said two collars normally urging the slidable collar against said shoulder.

9. In a glider launching and towing apparatus, a plate including a sheave journaled at the front thereof, a buffer mounted on said plate to the rear of said journaled sheave, and a sheave post at one side thereof, a take-up line passed from one side around the sheave and through the buffer, a releasable coupling connecting the end of the take-up line to a tow line, said coupling including a closed end cylinder connected at its closed end to the tow line, a sleeve member slidably fitting within this cylinder, said sleeve member having a collar fixed in the end which fits into the cylinder, a pin member in said sleeve member passing through said collar and having a shoulder normally resting against said collar, a spring having one end thereof biasing said pin member, the other end of said spring resting against a plug member which is connected to the take-up line and which rests against an internal shoulder in said sleeve, the sleeve having flexible prongs extending circumferentially about said take-up line and being of wedge form at their ends, a collar fitting around said wedged portions normally resting against a shoulder formed by enlargements at the ends of said prongs, the cylinder having an internal groove formed near its open end, and a shoulder normally fitting in said groove formed by projections on the prongs so as to normally lock the sleeve member within the cylinder, movement of the collar backward over the wedged portions drawing the prongs towards the axis and withdrawing the shoulder formed by said prongs from the groove in the cylinder, thereby releasing the coupling and a spring-pressed collar within said buffer having an opening therein sufficiently large to permit the ends of the prongs to enter therein while the collar on the prongs is moved by the outer edge of the collar in the buffer to release said coupling, the cylinder being assisted in its releasing operation by the pressure of said pin member against the closed end of the cylinder.

ROBERT B. COTTON.

REFERENCES CITED

The following references are of record in the file of this patent:

UNITED STATES PATENTS

| Number | Name | Date |
|---|---|---|
| 1,494,910 | Hench | May 20, 1924 |
| 2,369,518 | Ballard | Feb. 13, 1945 |

OTHER REFERENCES

Publication, Popular Mechanics, pages 14 and 15 of Oct. 1942.

"Popular Mechanics," Oct. 1942, page 15.

Certificate of Correction

Patent No. 2,432,508.   December 16, 1947.

ROBERT B. COTTON

It is hereby certified that errors appear in the printed specification of the above numbered patent requiring correction as follows: Column 6, line 50, claim 7, cancel the word "wherein" and insert instead *a sheave in front of the glider around which*; same line, cancel "other" and insert instead *anchored*; line 51, cancel "around a sheave" line 52, cancel "force" and insert instead *line take-up means*; line 53, cancel "source", first occurrence; same line, cancel "force source" and insert instead *line take-up means*; and that the said Letters Patent should be read with these corrections therein that the same may conform to the record of the case in the Patent Office.

Signed and sealed this 23rd day of March, A. D. 1948.

[SEAL]

THOMAS F. MURPHY,
*Assistant Commissioner of Patents.*